United States Patent
Li et al.

(10) Patent No.: US 11,361,564 B2
(45) Date of Patent: Jun. 14, 2022

(54) IMAGE INTEGRATED PRINTING SYSTEM CAPABLE OF COMBINING AN IMAGE AND RELATED INFORMATION WITH A BLANK FORM TO GENERATE AN OUTPUT FILE AND IMAGE INTEGRATED

(71) Applicant: AVISION INC., Hsinchu (TW)

(72) Inventors: Chen-Chang Li, Miaoli County (TW); Chun-Chieh Liao, Hsinchu (TW); Shao-Lan Sheng, Hsinchu (TW); Xiang-Chi Lee, Taoyuan (TW); Cheng-Chen Tseng, Hsinchu County (TW)

(73) Assignee: AVISION INC., Hsinchu (TW)

( * ) Notice: Subject to any disclaimer, the term of this patent is extended or adjusted under 35 U.S.C. 154(b) by 107 days.

(21) Appl. No.: 16/237,738

(22) Filed: Jan. 1, 2019

(65) Prior Publication Data
US 2019/0205633 A1 Jul. 4, 2019

(30) Foreign Application Priority Data
Jan. 2, 2018 (TW) .................................. 107100078

(51) Int. Cl.
*G06V 30/00* (2022.01)
*G06V 30/412* (2022.01)
(Continued)

(52) U.S. Cl.
CPC .......... *G06V 30/412* (2022.01); *G06V 30/414* (2022.01); *H04N 1/00222* (2013.01); *H04N 1/00702* (2013.01)

(58) Field of Classification Search
CPC .......... G06K 9/00449; G06K 9/00463; H04N 1/00222; H04N 1/00702
See application file for complete search history.

(56) References Cited

U.S. PATENT DOCUMENTS

| | | | |
|---|---|---|---|
| 6,801,658 B2 * | 10/2004 | Morita | G06Q 40/00 |
| | | | 235/379 |
| 2006/0271224 A1 * | 11/2006 | Lopez | G06Q 10/087 |
| | | | 700/106 |

(Continued)

FOREIGN PATENT DOCUMENTS

| | | |
|---|---|---|
| CN | 101523413 A | 9/2009 |
| CN | 101937463 A | 1/2011 |

(Continued)

*Primary Examiner* — Pakee Fang
(74) *Attorney, Agent, or Firm* — Winston Hsu

(57) ABSTRACT

An image integrated printing system includes an image capturing device, a host device, and a printing device. The image capturing device is for capturing an image of an object. The host device is electrically connected to the image capturing device and includes a storage unit, a recognition unit, and a processing unit. The storage unit is for storing the image transmitted from the image capturing device and a form. The recognition unit is for recognizing a field corresponding to the image from the form. The processing unit is electrically connected to the storage unit and the recognition unit and for combining the image with the field corresponding to the image to generate an output file. The printing device is electrically connected to the host device and for printing the output file.

8 Claims, 3 Drawing Sheets

(51) Int. Cl.
*H04N 1/00* (2006.01)
*G06V 30/414* (2022.01)

(56) References Cited

U.S. PATENT DOCUMENTS

| | | | |
|---|---|---|---|
| 2010/0128922 A1* | 5/2010 | Navon | E04H 1/06 |
| | | | 382/100 |
| 2013/0238966 A1* | 9/2013 | Barrus | G06K 9/00449 |
| | | | 715/223 |
| 2014/0029853 A1* | 1/2014 | Xue | G06K 9/18 |
| | | | 382/182 |
| 2016/0147386 A1* | 5/2016 | Han | G06F 40/279 |
| | | | 715/838 |

FOREIGN PATENT DOCUMENTS

| | | |
|---|---|---|
| CN | 104991761 A | 10/2015 |
| TW | 201405440 A | 2/2014 |

\* cited by examiner

IMAGE INTEGRATED PRINTING SYSTEM CAPABLE OF COMBINING AN IMAGE AND RELATED INFORMATION WITH A BLANK FORM TO GENERATE AN OUTPUT FILE AND IMAGE INTEGRATED

BACKGROUND OF THE DISCLOSURE

1. Field of the Disclosure

The present disclosure relates to an image integrated printing system and an image integrated printing method, and more particularly, to an image integrated printing system, which is capable of combining an image and related information included therein with a blank form to generate an output file and then printing the output file, and a related image integrated printing method.

2. Description of the Prior Art

With development of society and advancement of technology, a variety of customized services are provided for customers to meet different demands. Generally, when a customer would like to submit an application for a desired service, it is a standard procedure to fill out an application form and attach related identification document to the application form, such as copy of identification card or driver license. However, currently, it is required for a customer service or a customer to print the application form and make a copy of the identification document in advance and then to attach the copy of the identification document onto the submitted application form. Therefore, the application process is complicated, and it takes a long time to complete the application process.

SUMMARY OF THE DISCLOSURE

Therefore, it is an objective of the present disclosure to provide an image integrated printing system, which is capable of combining an image and related information included therein with a blank form to generate an output file and then printing the output file, and a related image integrated printing method.

In order to achieve the aforementioned objective, the present disclosure discloses an image integrated printing system. The image integrated printing system includes an image capturing device, a host device and a printing device. The image capturing device is for capturing an image of an object. The host device is electrically connected to the image capturing device, and the host device includes a storage unit, a recognition unit and a processing unit. The storage unit is for storing the image transmitted from the image capturing device and a form. The recognition unit is for recognizing a field corresponding to the image from the form. The processing unit is electrically connected to the storage unit and the recognition unit and for combining the image with the field corresponding to the image to generate an output file. The printing device is electrically connected to the host device and for printing the output file.

According to an embodiment of the present disclosure, the recognition unit recognizes the field corresponding to the image from the form by means of recognizing a format of the form by optical graph recognition.

According to an embodiment of the present disclosure, wherein the recognition unit recognizes the field having a size matching with a size of the image from the form according to the size of the image.

According to an embodiment of the present disclosure, the recognition unit recognizes the field corresponding to the image from the form by means of recognizing at least one character of the image by optical character recognition.

According to an embodiment of the present disclosure, the recognition unit further recognizes at least one character of the image by optical character recognition and further recognizes another field corresponding to the at least one character of the image from the form by optical character recognition, and the processing unit fills the at least one character recognized by the recognition unit into the another field corresponding to the at least one character of the image.

According to an embodiment of the present disclosure, the recognition unit further recognizes at least one character of the image by optical character recognition and further recognizes another field corresponding to the at least one character of the image from the form by coordinate positioning according to a predetermined coordinate, and the processing unit fills the at least one character recognized by the recognition unit into the another field corresponding to the at least one character of the image.

According to an embodiment of the present disclosure, the recognition unit recognizes the field corresponding to the image from the form by coordinate positioning according to a predetermined coordinate.

According to an embodiment of the present disclosure, a storage format of each of the image and the form is JBIG, JPG, JPEG or TIFF file format.

According to an embodiment of the present disclosure, the image capturing device is a scanner for scanning the object to generate the image corresponding to the object.

In order to achieve the aforementioned objective, the present disclosure further discloses an image integrated printing method. The image integrated printing method includes utilizing an image capturing device to capture an image of the object; a recognition unit of a host device recognizing a field corresponding to the image from a form stored in a storage unit of the host device; a processing unit of the host device combining the image with the field corresponding to the image to generate an output file; and utilizing a printing device to print the output file.

According to an embodiment of the present disclosure, the recognition unit of the host device recognizing the field corresponding to the image from the form stored in the storage unit of the host includes the recognition unit recognizes the field corresponding to the image from the form by means of recognizing a format of the form by optical graph recognition.

According to an embodiment of the present disclosure, the recognition unit recognizes the field having a size matching with a size of the image from the form according to the size of the image.

According to an embodiment of the present disclosure, the recognition unit of the host device recognizing the field corresponding to the image from the form stored in the storage unit includes the recognition unit recognizing the field corresponding to the image from the form by means of recognizing at least one character of the image by optical character recognition.

According to an embodiment of the present disclosure, the image integrated printing method further includes the recognition unit further recognizing at least one character of the image by optical character recognition and further recognizing another field corresponding to the at least one character of the image from the form by optical character recognition; and the processing unit filling the at least one character recognized by the recognition unit into the another field corresponding to the at least one character of the image.

According to an embodiment of the present disclosure, the image integrated printing method further includes the recognition unit further recognizing at least one character of the image by optical character recognition and further recognizing another field corresponding to the at least one character of the image from the form by coordinate positioning according to a predetermined coordinate; and the processing unit filling the at least one character recognized by the recognition unit into the another field corresponding to the at least one character of the image.

According to an embodiment of the present disclosure, the recognition unit of the host device recognizing the field corresponding to the image from the form stored in the storage unit of the host includes the recognition unit recognizing the field corresponding to the image from the form by coordinate positioning according to a predetermined coordinate.

In summary, the present disclosure utilizes the recognition unit to recognize the field corresponding to the image from the form and further utilizes the processing unit to combine the image with the field corresponding to the image. Furthermore, the present disclosure further utilizes the recognition unit to recognize the character of the image and the field corresponding to the character of the image and further utilizes the processing unit to fill the character into the field corresponding to the character of the image. In such a way, when it is desired to submit an application for a desired service, it only has to use the image capturing device to capture an image of identification document. Afterwards, the image integrated printing system can combine the image of the identification document with a blank application form and further print the completed application form automatically. It is not required anymore to execute the complicated procedure in the prior art manually, such as printing related document, filling out the application form and cutting and pasting the copy of the identification document. Therefore, it simplifies the application process and saves time.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
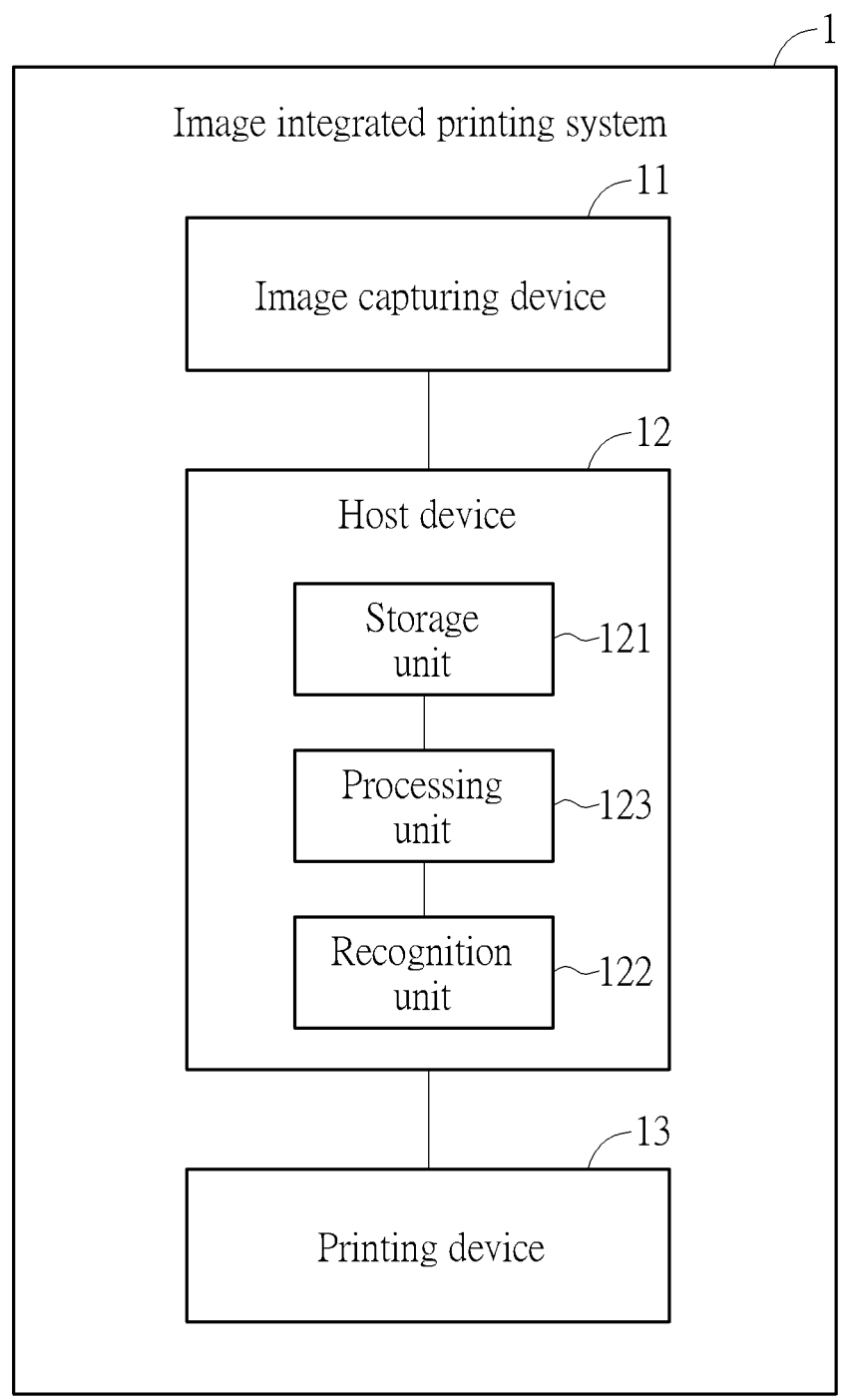
FIG. 1 is a functional block diagram of an image integrated printing system according to an embodiment of the present disclosure.
Figure 2:
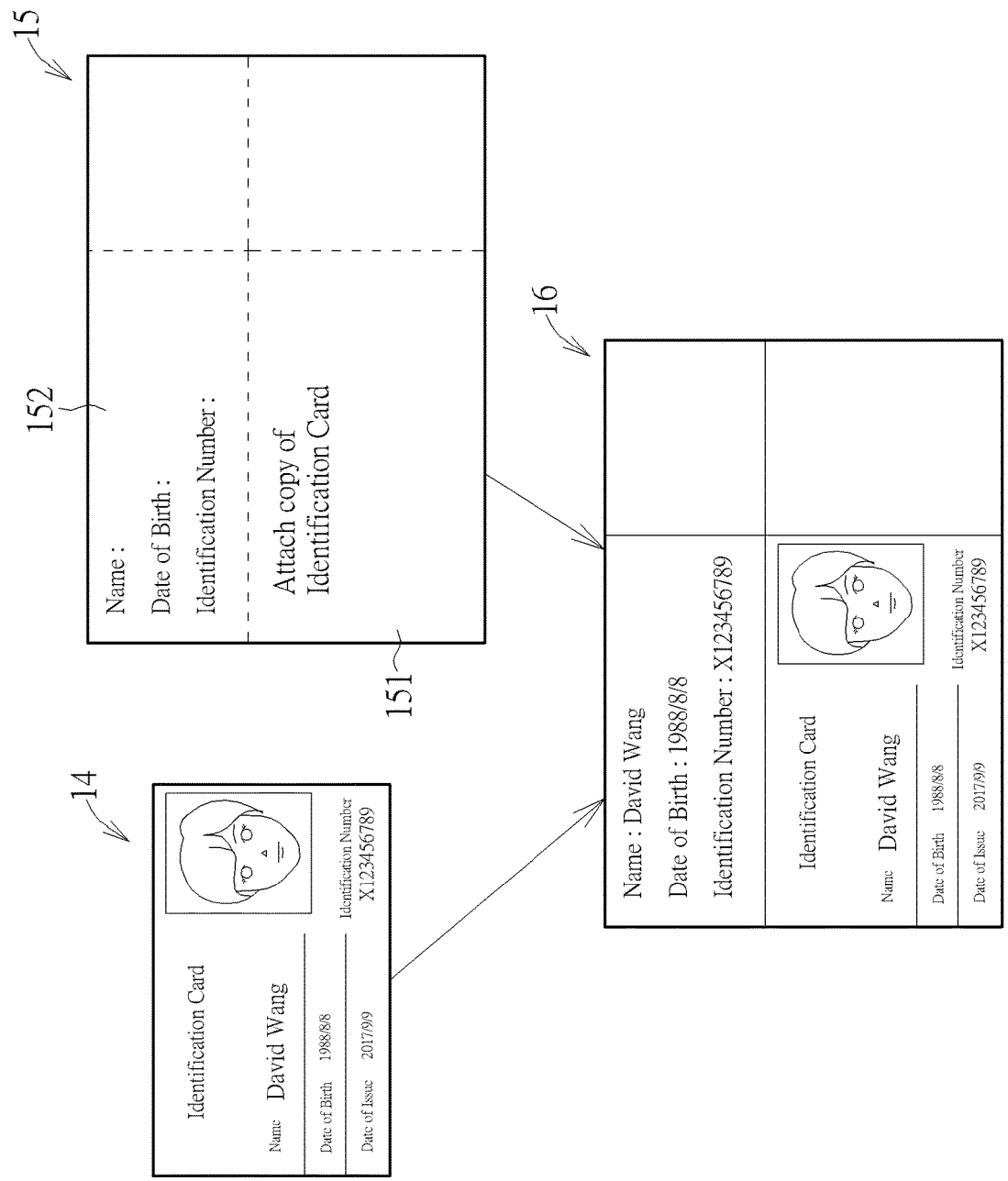
FIG. 2 is a diagram illustrating that an image is combined with a form to generate an output file according to the embodiment of the present disclosure.

Please refer to FIG. 1 and FIG. 2. FIG. 1 is a functional block diagram of an image integrated printing system 1 according to an embodiment of the present disclosure. FIG. 2 is a diagram illustrating that an image 14 is combined with a form 15 to generate an output file 16 according to the embodiment of the present disclosure. In the present disclosure, the image integrated printing system 1 can be used for facilitating a customer service to complete an application with related information of a client. As shown in FIG. 1, the image integrated printing system 1 includes an image capturing device 11, a host device 12 and a printing device 13. The image capturing device 11 is for capturing the image 14 of an object, such as identification document which can be an identification card, a health insurance card or a driver license. In this embodiment, the image capturing device 11 can be a scanner for scanning the object to generate the image 14. However, it is not limited thereto. The image capturing device 11 also can be a camera for shooting the object to generate the image 14. The host device 12 is electrically connected to the image capturing device 11 and includes a storage unit 121, a recognition unit 122 and a processing unit 123. The storage unit 121 is for storing the image 14 transmitted from the image capturing device 11 and the form 15, such as a blank application form. The processing unit 123 is electrically connected to the storage unit 121 and the recognition unit 122 for combining the image 14 and related information included in the image 14 with fields in the form 15 corresponding to the image 14 to generate the output file 16. In this embodiment, since the output file 15 can be saved as a new file, the form 15 is prevented from being overwritten, which allows the form 15 to be reused. Furthermore, in this embodiment, a storage format of each of the image 14 and the form 15 can be JBIG, JPG, JPEG or TIFF file format for preventing any unintentional mistake to accelerate the following image processing.

The storage unit 121 can be a memory unit, such as a hard disc drive, a flash memory or other readable digital data storage assembly. The recognition unit 122 is for recognizing fields corresponding to the image 14 and the related information included in the image 4 from the form 15. The recognition unit 122 can be an image recognition programmed circuit or a coordinate application programmed circuit. The processing unit 123 can be a processor or a micro-processor. However, the storage unit 121, the recognition unit 122 and the processing unit 123 of the host device 12 are not limited thereto. Furthermore, the output file 16 can be an editable file or an uneditable file. It depends on practical demands. The printing device 13 is electrically connected to the host device 12 and for printing the output file 16. The printing device 13 can be a printer or a multi-function apparatus.

Figure 3:
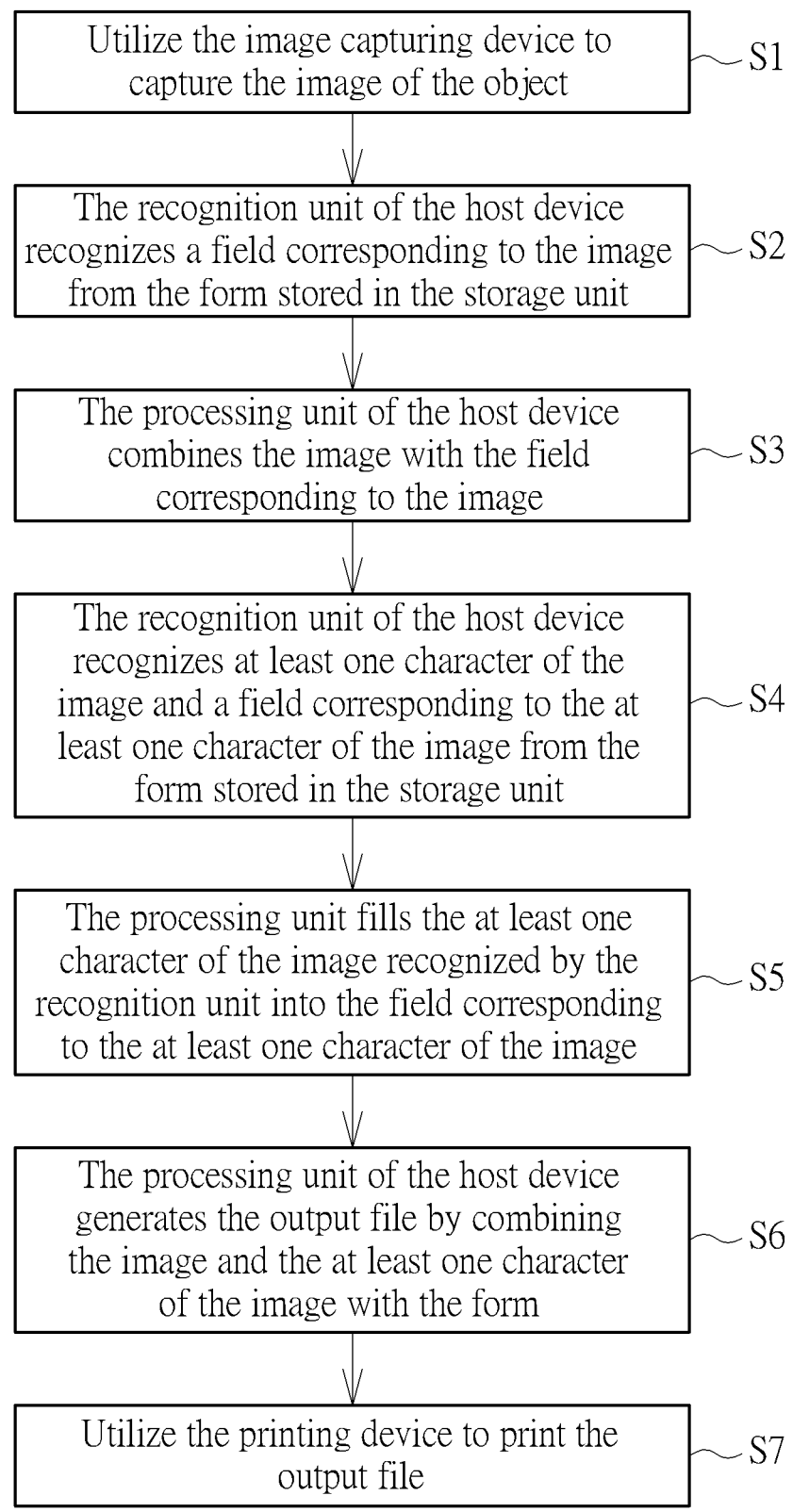
FIG. 3 is a flow chart diagram of an image integrated printing method performed by the image integrated printing system according to the embodiment of the present disclosure.

Please refer to FIG. 3. FIG. 3 is a flow chart diagram of an image integrated printing method performed by the image integrated printing system 1 according to the embodiment of the present disclosure. As shown in FIG. 3, the image integrated printing method includes the following steps:

S1: Utilize the image capturing device 11 to capture the image 14 of the object;

S2: The recognition unit 122 of the host device 12 recognizes a field 151 corresponding to the image 14 from the form 15 stored in the storage unit 121;

S3: The processing unit 123 of the host device 12 combines the image 14 with the field 151 corresponding to the image 14;

S4: The recognition unit 122 of the host device 12 recognizes at least one character of the image 14 and a field 152 corresponding to the at least one character of the image 14 from the form 15 stored in the storage unit 121;

S5: The processing unit 123 fills the at least one character of the image 14 recognized by the recognition unit 122 into the field 152 corresponding to the at least one character of the image 14;

S6: The processing unit 123 of the host device 12 generates the output file 16 by combining the image 14 and the at least one character of the image 14 with the form 15; and S7: Utilize the printing device 13 to print the output file 16.

More detailed description for the steps of the method is provided as follows. When it is desired to generate completed application document, the image capturing device 11 can be utilized to capture the image 14 of the object and then the captured image 14 can be stored into the storage unit 121 (step S1). Afterwards, the recognition unit 122 can recognize the field 151 corresponding to the image 141 stored in the storage unit 121 (step S2). For example, the recognition unit 122 can recognize the field 151 corresponding to the image 14 from the form 15 by means of recognizing a format of the form 15 by optical graph recognition. In other words, the recognition unit 122 can recognize the field 151 having a size matching with a size of the image 14 according to the size of the image 14. The recognition unit 122 also can recognize the field 151 corresponding to at least one character of the image 14 from the form 15 by means of recognizing the at least one character of the image 14 by optical character recognition. Furthermore, the recognition unit 122 also can recognize the field 151 corresponding to at least one character or at least one graphic of the image 14 from the form 15 by coordinate positioning according to a predetermined coordinate of the at least one character or the at least one graphic of the image 14. For example, as shown in FIG. 2, if the recognition unit 122 recognizes a string of "Identification Card" included in the image 14 by optical character recognition, the recognition unit 122 can recognize the field 151 which includes a string of "Attach copy of Identification Card" according to the aforementioned recognition result. Alternatively, if the recognition unit 122 recognizes a string of "Identification Card" included in the image 14 by optical character recognition, the recognition unit 122 can recognize the field 151 according to a predetermined coordinate corresponding to the string of "Identification Card" included in the image 14. When the recognition unit 122 recognizes the field 151 corresponding to the image 14 from the form 15 stored in the storage unit 121 and, the processing unit 123 of the host device 12 can combine the image 14 with the field 151 corresponding to the image 14.

Furthermore, the recognition unit 122 of the host device 12 can further recognize the at least one character of the image 14 and the field 152 corresponding to the at least one character of the image 14 from the form 15. The processing unit 123 can fill the at least one character of the image 14 into the field 152 corresponding to the image 14 (steps S4 and S5). For example, as shown in FIG. 2, if the recognition unit 122 recognizes a string of "David Wang" registered in an item of "Name" of the image 14, a string of "1988/8/8" registered in an item of "Date of Birth" and a string of "X123456789" registered in an item of "Identification Number", the recognition unit 122 can recognize the fields 152, which are required to be filled with a name, a date of birth and an identification number, from the form 15 by optical graphic recognition, optical character recognition, or coordinate positioning. Afterward, the processing unit 123 can fill the string of "David Wang", the string of "1988/8/8" and the string of "X123456789" into the fields 152 recognized by the recognition unit 122 to output the output file 16 (step S6). At last, the host device 12 can send the output file 16 to the printing device 13 and control the printing device 13 to print the output file 16, so as to complete the application document (step S7). Furthermore, the present disclosure can be configured to only combine the image 14 with the field 151 or only fill the at least one character into the field 152. It depends on practical demands.

In contrast to the prior art, the present disclosure utilizes the recognition unit to recognize the field corresponding to the image from the form and further utilizes the processing unit to combine the image with the field corresponding to the image. Furthermore, the present disclosure further utilizes the recognition unit to recognize the character of the image and the field corresponding to the character of the image and further utilizes the processing unit to fill the character into the field corresponding to the character of the image. In such a way, when it is desired to submit an application for a desired service, it only has to use the image capturing device to capture an image of identification document. Afterwards, the image integrated printing system can combine the image of the identification document with a blank application form and further print the completed application form automatically. It is not required anymore to execute the complicated procedure in the prior art manually, such as printing related document, filling out the application form and cutting and pasting the copy of the identification document. Therefore, it simplifies the application process and saves time.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image integrated printing system comprising:
    an image capturing device for capturing a whole image of an object in paper or card form;
    a host device electrically connected to the image capturing device, and the host device comprising:
        a digital data storage assembly for storing the whole image of the object transmitted from the image capturing device and a form comprising a plurality of fields with different sizes;
        a programmed circuit for recognizing a size of the whole image of the object and further recognizing a corresponding one of the plurality of fields from the plurality of fields of the form according to the size of the whole image of the object by means of recognizing a format of the form by optical graph recognition, wherein a size of the corresponding one of the plurality of fields matches with the size of the whole image of the object; and
        a processor electrically connected to the digital data storage assembly and the programmed circuit and for combining the whole image of the object with the corresponding one of the plurality of fields corresponding to the whole image of the object and having the size matching with the size of the whole image of the object to generate an output file; and
    a printing device electrically connected to the host device and for printing the output file.

2. The image integrated printing system of claim 1, wherein the programmed circuit further recognizes at least one character of the whole image of the object by optical character recognition and further recognizes another field corresponding to the at least one character of the whole image of the object from the form by optical character recognition, and the processor fills the at least one character recognized by the programmed circuit into the another field corresponding to the at least one character of the whole image of the object.

3. The image integrated printing system of claim 1, wherein the programmed circuit further recognizes at least one character of the whole image of the object by optical character recognition and further recognizes another field corresponding to the at least one character of the whole image of the object from the form by coordinate positioning according to a predetermined coordinate, and the processor fills the at least one character recognized by the programmed circuit into the another field corresponding to the at least one character of the whole image of the object.

4. The image integrated printing system of claim 1, wherein a storage format of each of the whole image of the object and the form is JBIG, JPG, JPEG or TIFF file format.

5. The image integrated printing system of claim 1, wherein the image capturing device is a scanner for scanning the object to generate the whole image of the object corresponding to the object.

6. An image integrated printing method comprising:
   utilizing an image capturing device to capture a whole image of an object in paper or card form;
   utilizing a digital data storage assembly to store the whole image of the object transmitted from the image capturing device and a form comprising a plurality of fields with different sizes;
   a programmed circuit of a host device recognizing a size of whole image of the object and further recognizing a corresponding one of the plurality of fields from the plurality of fields of the form stored in the digital data storage assembly of the host device according to the size of the whole image of the object by means of recognizing a format of the form by optical graph recognition, wherein a size of the corresponding one of the plurality of fields matches with the size of the whole image of the object;
   a processor of the host device combining the whole image of the object with the corresponding one of the plurality of fields corresponding to the whole image of the object and having the size matching with the size of the whole image of the object to generate an output file; and
   utilizing a printing device to print the output file.

7. The image integrated printing method of claim 6, further comprising:
   the programmed circuit further recognizing at least one character of the whole image of the object by optical character recognition and further recognizing another field corresponding to the at least one character of the whole image of the object from the form by optical character recognition; and
   the processor filling the at least one character recognized by the programmed circuit into the another field corresponding to the at least one character of the whole image of the object.

8. The image integrated printing method of claim 6, further comprising:
   the programmed circuit further recognizing at least one character of the whole image of the object by optical character recognition and further recognizing another field corresponding to the at least one character of the whole image of the object from the form by coordinate positioning according to a predetermined coordinate; and
   the processor filling the at least one character recognized by the programmed circuit into the another field corresponding to the at least one character of the whole image of the object.

* * * * *